US012752665B2

(12) United States Patent
Ogaki

(10) Patent No.: US 12,752,665 B2
(45) Date of Patent: Oct. 6, 2026

(54) BATTERY TEMPERATURE ADJUSTMENT SYSTEM

(71) Applicant: HONDA MOTOR CO., LTD., Tokyo (JP)

(72) Inventor: Toru Ogaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 856 days.

(21) Appl. No.: 18/098,455

(22) Filed: Jan. 18, 2023

(65) Prior Publication Data

US 2023/0278465 A1 Sep. 7, 2023

(30) Foreign Application Priority Data

Jan. 21, 2022 (JP) ................................ 2022-008040

(51) Int. Cl.

*H01M 10/625* (2014.01)
*B60L 58/24* (2019.01)
*H01M 10/617* (2014.01)
*H01M 10/633* (2014.01)

(52) U.S. Cl.

CPC ........... *B60L 58/24* (2019.02); *H01M 10/617* (2015.04); *H01M 10/625* (2015.04); *H01M 10/633* (2015.04); *H01M 2220/20* (2013.01)

(58) Field of Classification Search

CPC .... B60L 58/24; B60L 58/25; B60L 2240/545; B60L 2260/44; B60L 2260/54; B60L 2260/56; B60L 7/10; B60L 58/26; B60L 58/27; B60L 53/16; B60L 53/53; H01M 10/617; H01M 10/625; H01M 10/633; H01M 2220/20; H01M 10/443; Y02T 10/70

See application file for complete search history.

(56) References Cited

U.S. PATENT DOCUMENTS

| | | | | |
|---|---|---|---|---|
| 2011/0117463 | A1* | 5/2011 | Lienkamp | H01M 10/0525 429/433 |
| 2015/0025699 | A1 | 1/2015 | Takahashi | |
| 2016/0107526 | A1* | 4/2016 | Jin | B60L 7/10 307/10.1 |
| 2019/0168738 | A1* | 6/2019 | Morisaki | G01C 21/3484 |
| 2019/0326652 | A1 | 10/2019 | Ogaki et al. | |
| 2020/0023750 | A1 | 1/2020 | Fukami et al. | |
| 2020/0079358 | A1* | 3/2020 | Tsujino | G08G 1/14 |
| 2020/0108724 | A1 | 4/2020 | Bartlett et al. | |
| 2020/0220230 | A1* | 7/2020 | Akaishi | H01M 10/443 |
| 2023/0094070 | A1* | 3/2023 | Duan | H01M 10/613 701/22 |
| 2023/0420765 | A1* | 12/2023 | Ku | H01M 10/6554 |

FOREIGN PATENT DOCUMENTS

| | | | |
|---|---|---|---|
| CN | 110722995 | A | 1/2020 |
| CN | 110979040 | A | 4/2020 |
| JP | 2007-015504 | A | 1/2007 |
| JP | 2016-113040 | A | 6/2016 |
| JP | 2017-097971 | A | 6/2017 |
| JP | 6579320 | B2 | 9/2019 |
| JP | 2019-193319 | A | 10/2019 |
| JP | 2021-027797 | A | 2/2021 |

OTHER PUBLICATIONS

May 30, 2023, Translation of Japanese Office Action issued for related JP Application No. 2022-008040.
Jan. 27, 2026, Translation of Chinese Office Action issued for related CN Application No. 202310037590.4.
Jul. 29, 2026, Translation of Chinese Office Action issued for related CN Application No. 202310037590.4.

* cited by examiner

*Primary Examiner* — Muhammad S Siddiquee
(74) *Attorney, Agent, or Firm* — Paratus Law Group, PLLC

(57) ABSTRACT

A battery temperature adjustment system includes: a battery; a temperature adjustment device to which electric power from the battery is supplied and configured to adjust a battery temperature; and a control device configured to execute a first control of controlling the temperature adjustment device to maintain the battery temperature. The control device acquires scheduled parking information of a vehicle, and determines whether a scheduled parking time period of the vehicle is equal to or longer than a predetermined time period based on the scheduled parking information. When the scheduled parking time period is shorter than the predetermined time period, the control device executes the first control during parking of the vehicle, and when the scheduled parking time period is equal to or longer than the predetermined time period, the control device does not execute the first control during parking of the vehicle.

9 Claims, 6 Drawing Sheets

BATTERY TEMPERATURE ADJUSTMENT SYSTEM

CROSS-REFERENCE TO RELATED APPLICATIONS

The present application claims the benefit of priority of Japanese Patent Application No. 2022-008040, filed on Jan. 21, 2022, the content of which is incorporated herein by reference.

TECHNICAL FIELD

The present disclosure relates to a battery temperature adjustment system that adjusts a temperature of a battery mounted on an electric vehicle or the like.

BACKGROUND ART

In recent years, as a specific measure against climatic variation of the earth, efforts to realize a low-carbon society or a decarbonized society have been actively made. Also in vehicles, a reduction in $CO_2$ emission amount is strongly required, and a drive source is rapidly electrified. Specifically, a vehicle including an electric motor as a drive source of the vehicle and a battery as a secondary battery capable of supplying electric power to the electric motor, such as an electrical vehicle or a hybrid electrical vehicle, has been developed.

In such an electric vehicle, a temperature of the battery is adjusted to a predetermined temperature range during parking from the viewpoint of maintaining vehicle performance. For example, Japanese Patent No. 6579320 discloses a temperature adjustment device that activates a temperature control unit at a predetermined timing during parking and adjusts a battery temperature when the battery temperature exceeds a predetermined threshold.

In addition, JP-A-2016-113040 discloses a battery temperature adjustment system that acquires a parking schedule of a vehicle, controls charging and discharging of a battery during traveling before parking is started, and prepares electric power necessary to adjust a battery temperature during parking.

When a vehicle is parked for a predetermined time, maintaining a battery temperature within a predetermined temperature range during parking as in Japanese Patent No. 6579320 or JP-A-2016-113040 leads to continued use of electric power. An electricity bill increases when the vehicle is connected to (plugged into) an external power source during parking. In addition, when the vehicle is disconnected (plugged off) from the external power source, electric power from the battery is used to maintain the temperature, and a state of charge (SOC) of the battery is lowered. It is difficult to continue to maintain the temperature after the SOC is lowered, causing adverse effects such as a decrease in battery output and a reduction in travelable distance. On the other hand, when the battery temperature is not adjusted to the predetermined temperature range during parking of the vehicle, there may be cases in which the battery usage is restricted when the vehicle is started up.

SUMMARY

The present disclosure provides a battery temperature adjustment system capable of reducing electric power consumption while maintaining convenience of a vehicle.

According to an aspect of the present disclosure, there is provided a battery temperature adjustment system including: a battery configured to supply electric power to a motor as a drive source of a vehicle; a temperature adjustment device to which electric power from the battery is supplied and configured to adjust a battery temperature; and a control device configured to execute a first control of controlling the temperature adjustment device to maintain the battery temperature within a predetermined temperature range, where: the control device acquires scheduled parking information of the vehicle in conjunction with schedule information of a user, and determines whether a scheduled parking time period of the vehicle is equal to or longer than a predetermined time period based on the scheduled parking information; and when the scheduled parking time period is shorter than the predetermined time period, the control device executes the first control during parking of the vehicle, and when the scheduled parking time period is equal to or longer than the predetermined time period, the control device does not execute the first control during parking of the vehicle.

According to the present disclosure, electric power consumption can be reduced while convenience of a vehicle can be maintained.

DESCRIPTION OF EMBODIMENTS

A battery temperature adjustment system according to an embodiment of the present disclosure will be described below with reference to the drawings.

[Vehicle]

Figure 1:
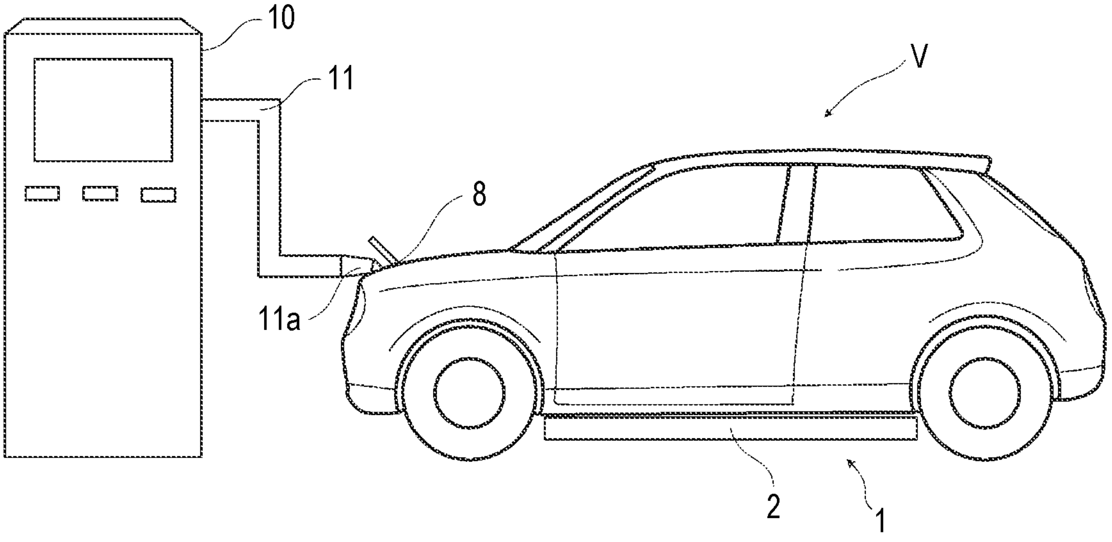
FIG. 1 is a schematic diagram showing a vehicle mounted with a battery temperature adjustment system of the present disclosure.
Figure 2:
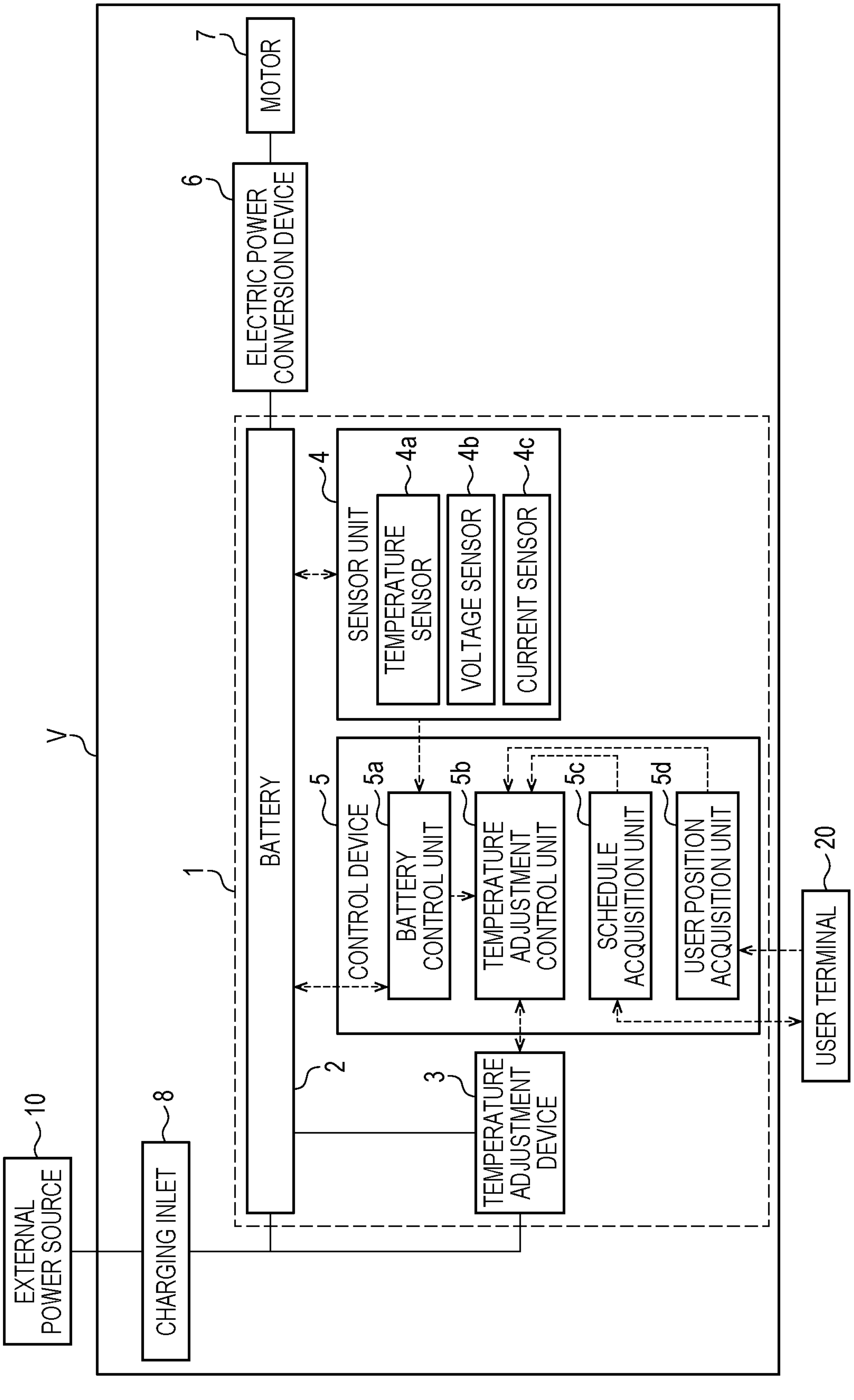
FIG. 2 is a block diagram showing a configuration of the battery temperature adjustment system of the present disclosure.

As shown in FIGS. 1 and 2, a battery temperature adjustment system 1 according to the present embodiment is mounted on a vehicle V. The vehicle V is, for example, an electric vehicle such as a plug-in hybrid vehicle or an electrical vehicle, and is configured such that a battery 2 can store electric power from an external power source 10 provided at a charging station, at home, or the like. The vehicle V is configured to be able to travel by driving a motor 7 as a drive source by the electric power stored in the battery 2.

The vehicle V is connected to (plugged into) the external power source 10 by connecting, to a charging inlet 8 provided in the vehicle V, a charging plug 11*a* of a charging cable 11 extending from the external power source 10. It should be noted that the connection between the vehicle V and the external power source 10 is not limited thereto. For example, the vehicle V may be provided with an electric power receiving coil or the like capable of contactlessly receiving electric power transmitted from the external power source 10. In addition, in the vehicle V, it is not necessary that the battery 2 can store the electric power from the external power source 10.

The vehicle V is configured to be able to communicate with a user terminal 20 held by a user. The user terminal 20 is, for example, a smartphone or a tablet terminal that can be carried by the user.

[Battery Temperature Adjustment System]

The battery temperature adjustment system 1 includes the battery 2, a temperature adjustment device 3 that cools or heats the battery 2, a sensor unit 4 that detects a state of the battery 2, and a control device 5 that controls the temperature adjustment device 3.

The battery 2 is formed by stacking a plurality of battery cells (not shown), and is, for example, a lithium ion battery or a nickel metal hydride battery. The battery 2 is connected to the external power source 10 by connecting the charging plug 11*a* to the charging inlet 8, and is configured to be able to store the electric power from the external power source 10. The electric power stored in the battery 2 is converted from a direct current into an alternating current by an inverter included in an electric power conversion device 6, and is supplied to the motor 7. In addition, when an alternating current generated by the motor 7 during braking of the vehicle V is input to the electric power conversion device 6, the alternating current is converted to a direct current by the inverter and supplied to the battery 2. That is, the battery 2 is configured to be able to store regenerated electric power.

The temperature adjustment device 3 includes a cooling device that cools the battery 2 by causing a refrigerant to flow through a refrigerant flow channel provided in the battery 2. The cooling device is, for example, a water-cooled type, circulates the refrigerant by a pump, and cools the refrigerant by a radiator. A heater is provided in the cooling device, and the battery 2 can be heated.

The electric power stored in the battery 2 is supplied to the temperature adjustment device 3. In addition, when the vehicle V is connected to the external power source 10, the electric power from the external power source 10 can be supplied to the temperature adjustment device 3. It should be noted that when the vehicle V is connected to the external power source 10, the electric power from the external power source 10 and the electric power from the battery 2 may be selectively supplied to the temperature adjustment device 3.

The sensor unit 4 includes a temperature sensor 4*a* that acquires a temperature of the battery 2 (hereinafter also referred to as battery temperature), a voltage sensor 4*b* that measures a voltage of the battery 2, and a current sensor 4*c* that measures a current flowing through the battery 2.

The control device 5 includes a battery control unit 5*a* that controls charging and discharging of the battery 2, a temperature adjustment control unit 5*b* that controls the temperature adjustment device 3, a schedule acquisition unit 5*c* that communicates with the user terminal 20 and acquires an action schedule of the user, and a user position acquisition unit 5*d* that acquires position information of the user terminal 20. For example, the control device 5 is implemented by an electronic control unit (ECU) including a processor, a memory, an interface, and the like. It should be noted that the battery control unit 5*a*, the temperature adjustment control unit 5*b*, the schedule acquisition unit 5*c*, and the user position acquisition unit 5*d* may be configured as separate control devices.

The battery temperature, the voltage of the battery 2, the current of the battery 2, and the like are input from the sensor unit 4 to the battery control unit 5*a*. In addition, the battery control unit 5*a* calculates the SOC of the battery 2 based on the input voltage and current. The battery control unit 5*a* controls charging and discharging of the battery 2 based on these input values and the SOC.

The temperature adjustment control unit 5*b* controls the temperature adjustment device 3 to maintain the battery temperature within a target temperature range. The control is also referred to as a normal temperature adjustment control. In addition to controlling the temperature adjustment device 3 during traveling of the vehicle V, the temperature adjustment control unit 5*b* also controls the temperature adjustment device 3 during parking of the vehicle V. For example, when the vehicle V is in a high temperature environment, the temperature adjustment control unit 5*b* acquires a current battery temperature from the battery control unit 5*a*, controls the temperature adjustment device 3 to maintain the battery temperature within a target temperature range (for example, around 30° C.), and cools the battery 2. Similarly, when the vehicle V is in a low temperature environment, the temperature adjustment control unit 5*b* acquires a current battery temperature from the battery control unit 5*a*, controls the temperature adjustment device 3 to maintain the battery temperature within a target temperature range, and heats the battery 2. Here, the normal temperature adjustment control corresponds to a "first control" in the present disclosure.

The schedule acquisition unit 5*c* is configured to be able to communicate with the user terminal 20, and acquires schedule information of the user in conjunction with schedule information registered in advance by the user in the user terminal 20. For example, the schedule acquisition unit 5*c* acquires scheduled departure/arrival date and time, a destination, scheduled travel information of the vehicle V, and scheduled parking information (including a scheduled parking start time and a scheduled parking end time) of a trip registered in the user terminal 20. The schedule information can be acquired at any timing, and for example, the schedule information is acquired when the vehicle V is started up.

It should be noted that when the schedule information of the user is stored in an external server different from the user terminal 20, the schedule acquisition unit 5*c* may communicate with the external server via a network to acquire the schedule information of the user. In addition, when the schedule information of the user is stored in a navigation device installed in the vehicle V, the schedule acquisition unit 5*c* may acquire the schedule information of the user from the navigation device.

The user position acquisition unit 5*d* is configured to be able to communicate with the user terminal 20, and acquires the position information of the user terminal 20 that receives a global positioning system (GPS) signal. Accordingly, the user position acquisition unit 5*d* can estimate a distance between the user terminal 20 and the vehicle V. The position information can be acquired at any timing, and for example, the position information is acquired at predetermined intervals.

[Control Executed by Battery Temperature Adjustment System]

Figure 3:
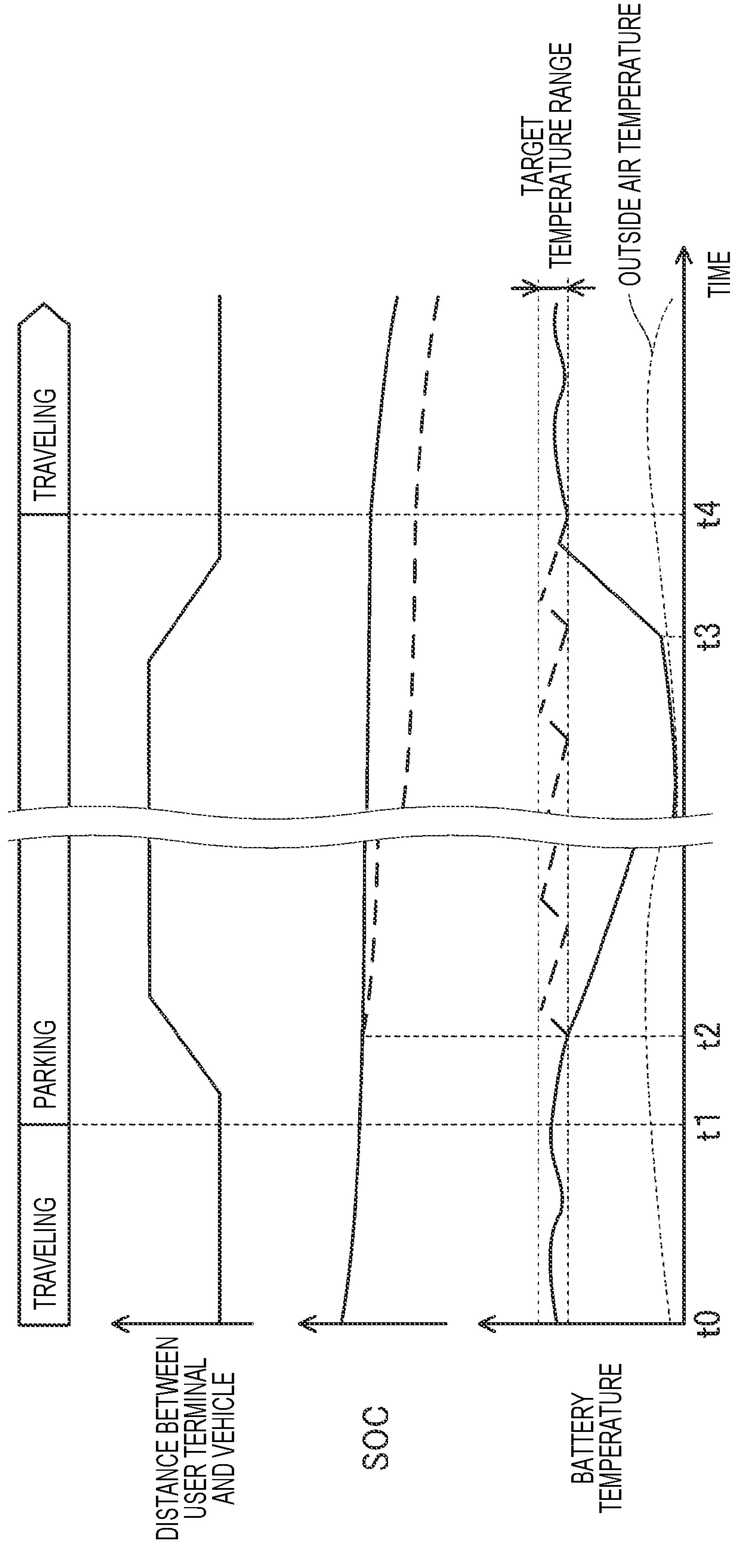
FIG. 3 is a graph showing temporal changes in a distance between a user terminal and the vehicle, an SOC of a battery, and a battery temperature when the battery temperature adjustment system of the present disclosure is operated.

FIG. 3 shows temporal changes in the distance between the user terminal 20 and the vehicle V, the SOC of the battery 2, and the battery temperature during parking of the vehicle V and during traveling before and after parking. Solid lines in the figure each represent a temporal change when the normal temperature adjustment control is not executed during parking of the vehicle V. Dashed lines in the figure each represent a temporal change when the normal temperature adjustment control (that is, the control of maintaining the battery temperature within the target temperature range) is constantly executed on the temperature adjustment device 3. The battery temperature graph also shows a target temperature range when the normal temperature adjustment control is executed and an outside air temperature around the vehicle V. It should be noted that FIG. 3 shows an example of a case in which the outside air temperature is lower than a target temperature of the battery (for example, a case in which the vehicle V is traveled and parked in a low temperature environment).

At time t0, the vehicle V is started up and starts traveling. For example, the vehicle V starts traveling from home to an airport parking lot. During the traveling of the vehicle V, the temperature adjustment control unit 5*b* executes the normal temperature adjustment control on the temperature adjustment device 3 such that the battery temperature is maintained within the target temperature range. When the normal temperature adjustment control is executed, the electric power from the battery 2 is supplied to the temperature adjustment device 3, and the SOC of the battery 2 is lowered. It should be noted that electric power consumption for driving the motor 7 may be included in the decrease in the SOC of the battery 2.

In addition, at the time t0, the schedule acquisition unit 5*c* acquires the scheduled parking information of the vehicle V in conjunction with the schedule information of the user registered in the user terminal 20. The scheduled parking information includes the scheduled parking start time, the scheduled parking end time, and a scheduled parking time period calculated therefrom.

At time t1, the vehicle V is parked in the airport parking lot. After the time t1, the user leaves the vehicle V, boards an airplane, and arrives at a destination. Accordingly, the distance between the vehicle V and the user terminal 20 held by the user is increased.

At the time t1, the schedule acquisition unit 5*c* determines whether the scheduled parking time period of the vehicle V is equal to or longer than the predetermined time period (for example, one day or longer) with reference to the scheduled parking information. In the example of FIG. 3, since the scheduled parking time period is from July 21 to July 28, it is determined that the scheduled parking time period is equal to or longer than the predetermined time period, that is, it is determined that the vehicle V is unlikely to be used for a while after parking.

When it is determined that the scheduled parking time period of the vehicle V is equal to or longer than the predetermined time period, the temperature adjustment control unit 5*b* ends the normal temperature adjustment control for the temperature adjustment device 3. Since the temperature adjustment control unit 5*b* does not execute the normal temperature adjustment control after the time t1, the battery temperature is not maintained within the target temperature range and decreases toward the outside air temperature lower than the target temperature range.

At time t2, the battery temperature of battery 2 deviates from the target temperature range. If the temperature adjustment control unit 5*b* executes the normal temperature adjustment control, as indicated by the dashed line, the battery temperature is controlled so as not to deviate from the target temperature range. In this case, electric power required for the normal temperature adjustment control is consumed from the battery 2, and the SOC of the battery 2 is lowered. In the present embodiment, when the vehicle V is unlikely to be used for a while after parking, the temperature adjustment control unit 5*b* does not execute the normal temperature adjustment control. Therefore, as compared with the case in which the temperature adjustment control unit 5*b* executes the normal temperature adjustment control, electric power consumption of the battery 2 during parking is reduced, and a decrease in SOC can be prevented. In addition, when the vehicle V is connected to the external power source 10 during parking, as compared with the case in which the temperature adjustment control unit 5*b* executes the normal temperature adjustment control, electric power consumption of the external power source 10 can be reduced.

Time t3 is a time earlier by a predetermined time than a scheduled parking end time t4 of the vehicle V, that is, a time at which the parking will end soon. At the time t3, the temperature adjustment control unit 5*b* executes the normal temperature adjustment control again. With such a configuration, the battery temperature, which is maintained at the outside air temperature, is increased to the target temperature range at which the battery 2 can be normally operated when the vehicle V starts traveling. Here, the predetermined time is a time required for the battery temperature to be adjusted by the normal temperature adjustment control from the current time t3 and the battery temperature to reach the target temperature range by the scheduled parking end time t4.

At the time t4, the user returns to the vehicle V from the destination and the parking is ended. Then, the user starts the traveling of the vehicle V.

It should be noted that in the present embodiment, the normal temperature adjustment control is started at the time t3 earlier by the predetermined time than the scheduled parking end time of the vehicle V, but the present disclosure is not limited thereto. For example, the normal temperature adjustment control may be started when the distance between the vehicle V and the user terminal 20 held by the user is equal to or shorter than a predetermined distance. With such a configuration, even when the user returns to the vehicle V from the destination earlier than the scheduled parking end time t4, the battery temperature can be increased in advance by the normal temperature adjustment control in accordance with movement of the user such that the battery 2 can be operated normally when the vehicle V starts traveling.

Figure 4:
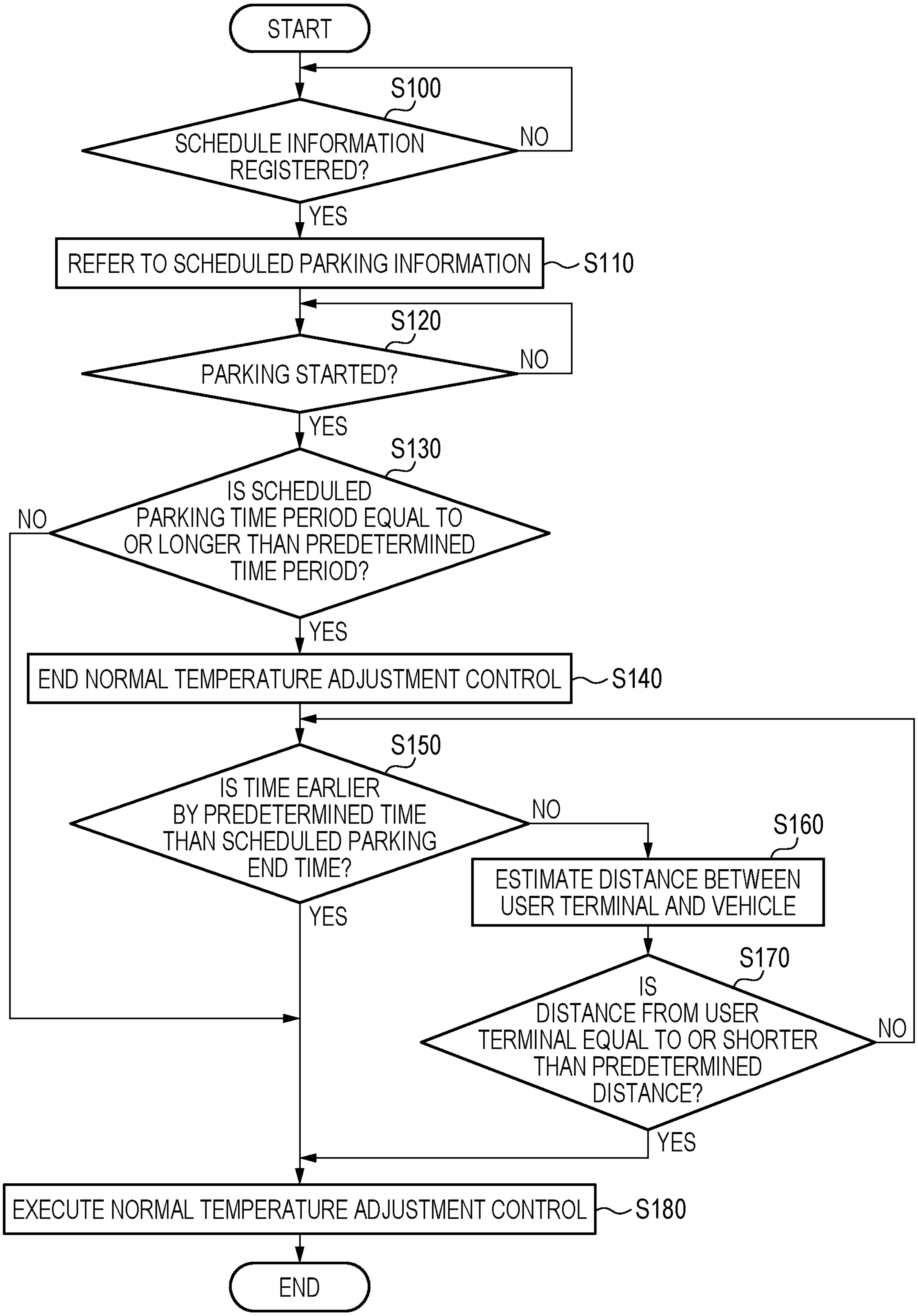
FIG. 4 is a diagram showing control flows executed by a control device.

Next, control of adjusting the temperature of the battery 2 by the control device 5 will be described with reference to FIG. 4.

In step S100, the schedule acquisition unit 5*c* determines whether the schedule information of the user is registered in the user terminal 20. When the schedule information is not registered (NO), the process returns to step S100 and monitors until the schedule information is registered. When the schedule information is registered (YES), the process proceeds to step S110.

In step S110, the schedule acquisition unit 5*c* acquires and refers to the scheduled parking information based on the schedule information.

In step S120, the schedule acquisition unit 5*c* determines whether the parking of the vehicle V is started. For example, it may be determined that the parking is started when the vehicle V is stopped for a certain time period, or it may be determined that the parking is started when the scheduled parking start time is reached. When it is determined that the parking of the vehicle V is not started (NO), the schedule acquisition unit 5*c* monitors until the parking is started. When it is determined that the parking of the vehicle V is started (YES), the process proceeds to step S130.

In step S130, the schedule acquisition unit 5*c* determines whether the scheduled parking time period of the vehicle V is equal to or longer than the predetermined time period. When it is determined that the scheduled parking time period is shorter than the predetermined time period (NO), a parking time period is short, and thus the process proceeds to step S180, and the temperature adjustment control unit 5*b* executes the normal temperature adjustment control. When it is determined that the scheduled parking time period is equal to or longer than the predetermined time period (YES), the process proceeds to step S140.

In step S140, the temperature adjustment control unit 5*b* ends the normal temperature adjustment control that is executed during the traveling of the vehicle V.

In step S150, the schedule acquisition unit 5*c* determines whether a current time is a time earlier by the predetermined time than the scheduled parking end time. When the current time is a time earlier by the predetermined time than the scheduled parking end time (YES), the parking will end soon, and thus the process proceeds to step S180. In step S180, the temperature adjustment control unit 5*b* executes the normal temperature adjustment control. Accordingly, the battery temperature can be set to an appropriate temperature when the vehicle V starts traveling. Therefore, restriction on the usage of the battery 2 when the vehicle V starts traveling can be avoided, and convenience of the vehicle V can be maintained. When the current time is not a time earlier by the predetermined time than the scheduled parking end time (NO), the process proceeds to step S160.

In step S160, the user position acquisition unit 5*d* estimates the distance between the user terminal 20 and the vehicle V.

In step S170, the schedule acquisition unit 5*c* determines whether the distance between the user terminal 20 and the vehicle V is equal to or shorter than the predetermined distance. When the distance is equal to or shorter than the predetermined distance, the process proceeds to step S180, and the temperature adjustment control unit 5*b* executes the normal temperature adjustment control. When the distance is longer than the predetermined distance, the process returns to step S150. Accordingly, even when a schedule of the user is changed, the battery 2 can be heated in advance by the normal temperature adjustment control in accordance with the movement of the user.

In this way, in the battery temperature adjustment system 1 according to the present embodiment, when it is determined that the scheduled parking time period of the vehicle V is equal to or longer than the predetermined time period, the normal temperature adjustment control of controlling the temperature adjustment device 3 to maintain the battery temperature within the target temperature range is not executed during parking of the vehicle V. Accordingly, when the vehicle V is unlikely to be used, it is possible to limit the adjustment of the battery temperature and reduce the electric power consumption of the temperature adjustment device 3 during parking.

Although an embodiment of the present disclosure has been described above with reference to the accompanying drawings, it is needless to say that the present disclosure is not limited to the embodiment. It is apparent to those skilled in the art that various changes and modifications can be conceived within the scope of the claims, and it is also understood that such changes and modifications naturally belong to the technical scope of the present disclosure. In addition, constituent elements in the above embodiment may be freely combined without departing from the spirit of the disclosure.

In the above embodiment, when it is determined that the scheduled parking time period is equal to or longer than the predetermined time period, the temperature adjustment control unit 5*b* may end the normal temperature adjustment control and execute power saving control to control the temperature adjustment device 3 with less electric power consumption than the normal temperature adjustment control. Specifically, in step S140 of FIG. 4, the temperature adjustment control unit 5*b* may end the normal temperature adjustment control and execute the power saving control. The power saving control is temperature adjustment control at a minimum level for maintaining performance of the battery 2 such that the performance of the battery 2 is not greatly reduced. Here, the power saving control corresponds to a "second control" in the present disclosure.

Figure 5:
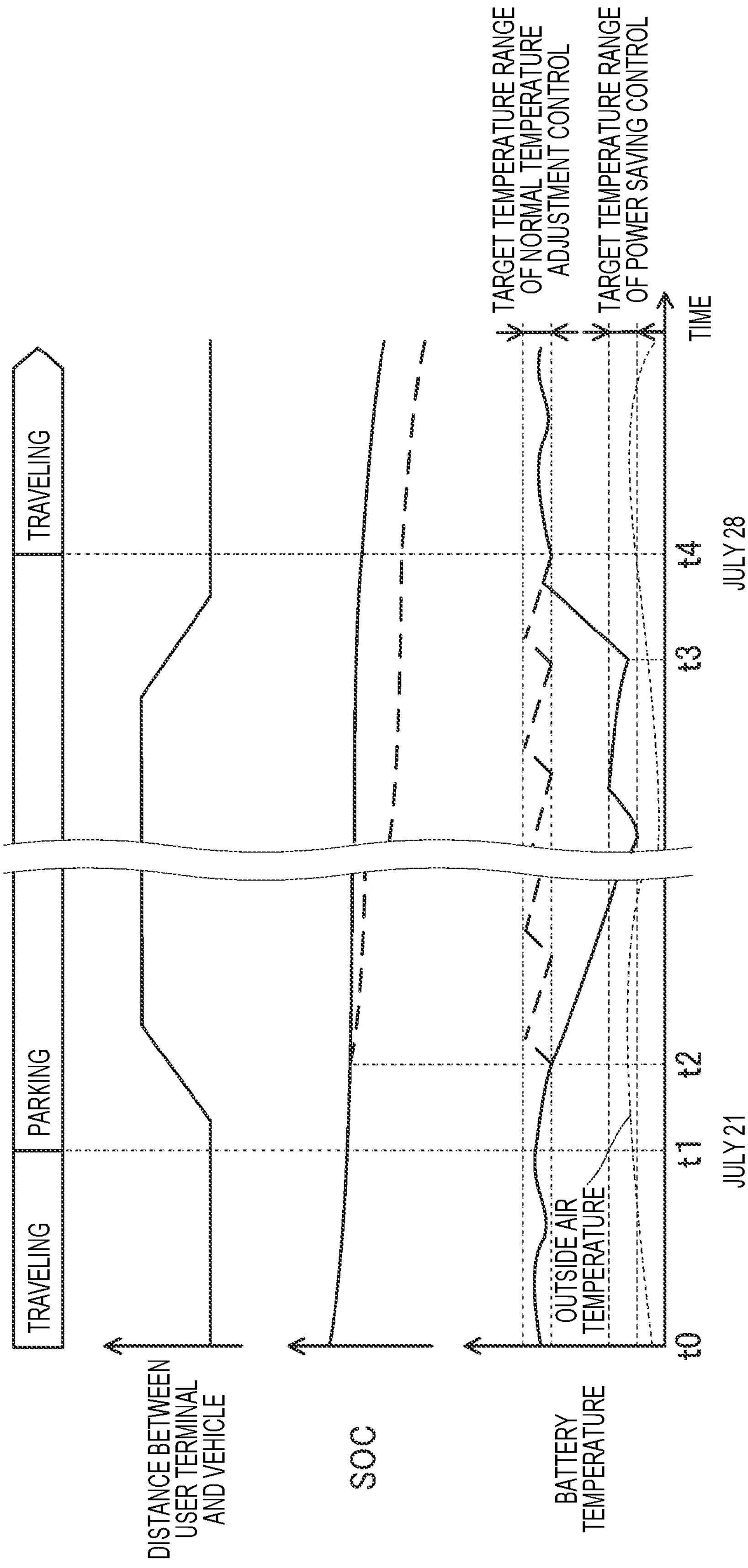
FIG. 5 is a graph showing temporal changes in the distance between the user terminal and the vehicle, the SOC of the battery, and the battery temperature when the battery temperature adjustment system of the present disclosure is operated in a case in which power saving control is executed.

By executing the power saving control, as shown in FIG. 5, during parking of the vehicle, the battery temperature is maintained within a target temperature range of the power saving control, which is lower than the target temperature range of the normal temperature adjustment control. By executing the power saving control during parking of the vehicle V, it is possible to limit the temperature adjustment control to the minimum level for maintaining the performance of the battery 2 when the vehicle V is unlikely to be used. Therefore, the electric power consumption can be reduced as in the above embodiment.

Figure 6:
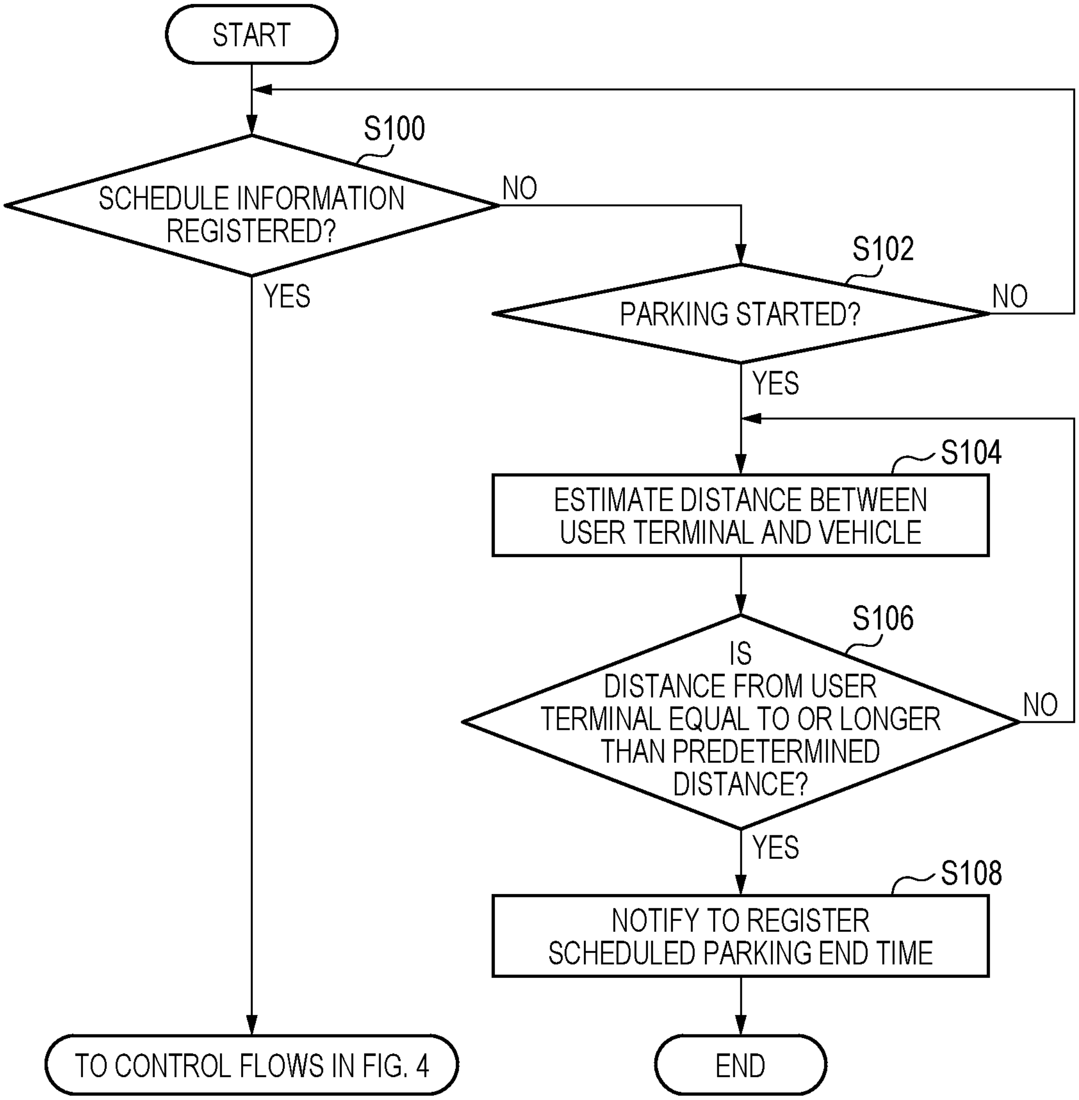
FIG. 6 is a diagram showing control flows when parking of the vehicle is started in a state where schedule information is not registered.

In the above embodiment, the schedule acquisition unit 5*c* acquires the scheduled parking information of the vehicle V before the vehicle V is parked, but it is conceivable that the schedule information of the user is not registered before the vehicle V is parked. For example, as shown in FIG. 6, it is conceivable that the schedule information is not registered in step S100 (NO) and it is determined in step S102 that the parking of the vehicle V is started (YES). In this case, the control device 5 may perform a process of prompting the user to register the scheduled parking end time.

Specifically, the user position acquisition unit 5*d* acquires the distance between the user terminal 20 and the vehicle V in step S104. In step S106, the user position acquisition unit 5*d* determines whether the distance is equal to or longer than the predetermined distance. When the distance is equal to or longer than the predetermined distance (YES), in step S108, the schedule acquisition unit 5*c* notifies the user terminal 20 to register the scheduled parking end time. After step S108, when the user registers the scheduled parking end time, the control is started from step S130 shown in FIG. 4. With such a configuration, by prompting the user to register the scheduled parking end time when the vehicle V is unlikely to be used, the temperature adjustment control unit 5*b* can know a time period during which the normal temperature adjustment control is not executed.

At least the following matters are described in the present specification. In the parentheses, the corresponding constituent elements and the like in the above embodiment are shown as an example, and the present disclosure is not limited thereto.

(1) A battery temperature adjustment system, including: a battery (battery 2) configured to supply electric power to a motor (motor 7) as a drive source of a vehicle (vehicle V);

a temperature adjustment device (temperature adjustment device 3) to which electric power from the battery is supplied and configured to adjust a battery temperature; and a control device (control device 5) configured to execute a first control of controlling the temperature adjustment device to maintain the battery temperature within a target temperature range, in which the control device acquires scheduled parking information of the vehicle in conjunction with schedule information of a user, and determines whether a scheduled parking time period of the vehicle is equal to or longer than a predetermined time period based on the scheduled parking information, and when the scheduled parking time period is shorter than the predetermined time period, the control device executes the first control during parking of the vehicle, and when the scheduled parking time period is equal to or longer than the predetermined time period, the control device does not execute the first control during parking of the vehicle.

According to (1), the control device determines whether the scheduled parking time period of the vehicle is equal to or longer than the predetermined time period based on the scheduled parking information, and executes the first control when it is determined that the scheduled parking time period is shorter than the predetermined time period. Therefore, by adjusting the battery temperature when the vehicle is likely to be used, restriction on the usage of the battery can be avoided, and convenience of the vehicle can be maintained. In addition, the control device does not execute the first control during parking of the vehicle when it is determined that the scheduled parking time period is equal to or longer than the predetermined time period. Therefore, when the vehicle is unlikely to be used, it is possible to limit the adjustment of the battery temperature and reduce the electric power consumption of the temperature adjustment device.

(2) The battery temperature adjustment system according to (1), in which when the scheduled parking time period is equal to or longer than the predetermined time period, the control device executes a second control of controlling the temperature adjustment device with less electric power consumption than the first control during parking of the vehicle.

According to (2), when it is determined that the scheduled parking time period is equal to or longer than the predetermined time period, the control device executes the second control of controlling the temperature adjustment device with less electric power consumption than the first control during parking of the vehicle, and thus, it is possible to limit the temperature adjustment control to the minimum level for maintaining the performance of the battery when the vehicle V is unlikely to be used. Therefore, the electric power consumption can be reduced.

(3) The battery temperature adjustment system according to (1) or (2), in which when the first control is not executed during parking of the vehicle, the control device starts the first control at a time earlier by a predetermined time than a scheduled parking end time obtained from the scheduled parking information.

According to (3), when the first control is not executed during parking of the vehicle, the control device starts the first control at the time earlier by the predetermined time than the scheduled parking end time obtained from the scheduled parking information, and thus, the battery temperature can be set to an appropriate temperature when the vehicle starts traveling. Therefore, restriction on the usage of the battery when the vehicle starts traveling can be avoided, and the convenience of the vehicle can be maintained.

(4) The battery temperature adjustment system according to any one of (1) to (3), in which the control device estimates a distance between the vehicle and a user terminal held by the user, and starts, when the first control is not executed during parking of the vehicle, the first control in a case in which the distance is equal to or shorter than a predetermined distance.

According to (4), when the first control is not executed during parking of the vehicle, the first control is started in the case in which the distance between the user terminal and the vehicle is equal to or shorter than the predetermined distance, and thus, the battery temperature can be set to an appropriate temperature when operation of the vehicle is started. Therefore, restriction on the usage of the battery when the operation of the vehicle is started can be avoided, and the convenience of the vehicle can be maintained.

(5) The battery temperature adjustment system according to any one of (1) to (4), in which the control device estimates a distance between the vehicle and a user terminal held by the user, and notifies, when the schedule information is not registered and the distance is equal to or longer than a predetermined distance, the user terminal to register a scheduled parking end time.

According to (5), when the schedule information is not registered and the distance between the user terminal and the vehicle is equal to or longer than the predetermined distance, the control device notifies the user terminal to register the scheduled parking end time, and thus, it is easy to know a time period during which the first control is not executed.

(6) The battery temperature adjustment system according to any one of (1) to (5), in which the battery is capable of storing electric power from an external power source, and the electric power from the external power source and the electric power from the battery are selectively supplied to the temperature adjustment device.

According to (6), the electric power from the external power source and the electric power from the battery are selectively supplied to the temperature adjustment device. When the temperature adjustment device can be operated by the electric power from the external power source, consumption of the electric power from the external power source can be reduced by not executing the first control. In addition, when the temperature adjustment device can be operated by the electric power from the battery, the SOC of the battery can be prevented from being lowered by not executing the first control.

The invention claimed is:

1. A battery temperature adjustment system comprising:

a battery configured to supply electric power to a motor as a drive source of a vehicle;

a temperature adjustment device to which electric power from the battery is supplied and configured to adjust a battery temperature; and a control device configured to execute a first control of controlling the temperature adjustment device to maintain the battery temperature within a predetermined temperature range, wherein:

the control device acquires scheduled parking information of the vehicle in conjunction with schedule information of a user, and determines whether a scheduled parking time period of the vehicle is equal to or longer than a predetermined time period based on the scheduled parking information;

when the scheduled parking time period is shorter than the predetermined time period, the control device executes the first control during parking of the vehicle, and when the scheduled parking time period is equal to or longer than the predetermined time period, the control device does not execute the first control during parking of the vehicle;

the control device estimates a distance between the vehicle and a user terminal held by the user; and when the first control is not executed during parking of the vehicle, and when the distance is equal to or shorter than a predetermined distance, the control device starts the first control.

2. The battery temperature adjustment system according to claim 1, wherein when the scheduled parking time period is equal to or longer than the predetermined time period, the control device executes a second control of controlling the temperature adjustment device with less electric power consumption than the first control during parking of the vehicle.

3. The battery temperature adjustment system according to claim 1, wherein when the first control is not executed during parking of the vehicle, the control device starts the first control at a time earlier by a predetermined time than a scheduled parking end time obtained from the scheduled parking information.

4. The battery temperature adjustment system according to claim 1, wherein:

the control device estimates a distance between the vehicle and a user terminal held by the user; and when the schedule information is not registered and the distance is equal to or longer than a predetermined distance, the control device notifies the user terminal to register a scheduled parking end time.

5. The battery temperature adjustment system according to claim 1, wherein:

the battery is capable of storing electric power from an external power source; and the electric power from the external power source and the electric power from the battery are selectively supplied to the temperature adjustment device.

6. A battery temperature adjustment system comprising:

a battery configured to supply electric power to a motor as a drive source of a vehicle;

a temperature adjustment device to which electric power from the battery is supplied and configured to adjust a battery temperature; and a control device configured to execute a first control of controlling the temperature adjustment device to maintain the battery temperature within a predetermined temperature range, wherein:

the control device acquires scheduled parking information of the vehicle in conjunction with schedule information of a user, and determines whether a scheduled parking time period of the vehicle is equal to or longer than a predetermined time period based on the scheduled parking information;

when the scheduled parking time period is shorter than the predetermined time period, the control device executes the first control during parking of the vehicle, and when the scheduled parking time period is equal to or longer than the predetermined time period, the control device does not execute the first control during parking of the vehicle;

the control device estimates a distance between the vehicle and a user terminal held by the user; and when the schedule information is not registered and the distance is equal to or longer than a predetermined distance, the control device notifies the user terminal to register a scheduled parking end time.

7. The battery temperature adjustment system according to claim 6, wherein when the scheduled parking time period is equal to or longer than the predetermined time period, the control device executes a second control of controlling the temperature adjustment device with less electric power consumption than the first control during parking of the vehicle.

8. The battery temperature adjustment system according to claim 6, wherein when the first control is not executed during parking of the vehicle, the control device starts the first control at a time earlier by a predetermined time than a scheduled parking end time obtained from the scheduled parking information.

9. The battery temperature adjustment system according to claim 6, wherein:

the battery is capable of storing electric power from an external power source; and the electric power from the external power source and the electric power from the battery are selectively supplied to the temperature adjustment device.

* * * * *